US012354820B2

(12) United States Patent
Tanimoto et al.

(10) Patent No.: US 12,354,820 B2
(45) Date of Patent: Jul. 8, 2025

(54) ELECTROMAGNETIC RELAY DEVICE

(71) Applicants: DENSO CORPORATION, Kariya (JP); DENSO ELECTRONICS CORPORATION, Anjo (JP)

(72) Inventors: Masahiro Tanimoto, Kariya (JP); Mitsugu Fujiwara, Kariya (JP); Hiroshi Nagura, Kariya (JP); Makoto Kamiya, Anjo (JP)

(73) Assignees: DENSO CORPORATION, Kariya (JP); DENSO ELECTRONICS CORPORATION, Anjo (JP)

( * ) Notice: Subject to any disclaimer, the term of this patent is extended or adjusted under 35 U.S.C. 154(b) by 188 days.

(21) Appl. No.: 17/940,056

(22) Filed: Sep. 8, 2022

(65) Prior Publication Data

US 2023/0005692 A1 Jan. 5, 2023

Related U.S. Application Data

(63) Continuation of application No. PCT/JP2021/009580, filed on Mar. 10, 2021.

(30) Foreign Application Priority Data

Mar. 11, 2020 (JP) ................................ 2020-042232

(51) Int. Cl.
*H01H 50/60* (2006.01)
*H01H 50/20* (2006.01)
*H01H 50/36* (2006.01)

(52) U.S. Cl.
CPC ............ *H01H 50/60* (2013.01); *H01H 50/20* (2013.01); *H01H 50/36* (2013.01)

(58) Field of Classification Search
CPC ........ H01H 50/60; H01H 50/20; H01H 50/36; H01H 50/023

(Continued)

(56) References Cited

U.S. PATENT DOCUMENTS

2015/0054604 A1* 2/2015 Kubono ................ H01H 50/20 335/177
2015/0054605 A1* 2/2015 Kubono ................ H01H 9/443 335/177

(Continued)

FOREIGN PATENT DOCUMENTS

CN 110651351 A 1/2020
JP 2005-347118 A 12/2005

(Continued)

*Primary Examiner* — Shawki S Ismail
*Assistant Examiner* — Lisa N Homza
(74) *Attorney, Agent, or Firm* — Oliff PLC

(57) ABSTRACT

In an electromagnetic relay device, a mover includes a movable contact movable to abut onto and separate from a stationary contact through a contact region defined between the movable and the stationary contacts. A plunger causes the mover to reciprocate to accordingly cause the movable contact to abut onto or separate from the stationary contact. A solenoid unit of the electromagnetic relay device includes an electromagnetic coil, a movable core, and a support member that slidably supports an outer peripheral surface of a slidable contact portion of the movable core. A movable wall member is located between the slidable contact portion and the contact region. The movable wall member reciprocates together with the plunger. The movable wall member is arranged to occupy a region in the electromagnetic relay device. The region contains at least the slidable contact portion when viewed in the reciprocation direction.

3 Claims, 17 Drawing Sheets

(58) Field of Classification Search
USPC .......................................................... 335/133
See application file for complete search history.

(56) References Cited

U.S. PATENT DOCUMENTS

| | | | | |
|---|---|---|---|---|
| 2016/0141132 | A1* | 5/2016 | Enomoto ............... | H01H 50/18 335/189 |
| 2018/0158635 | A1 | 6/2018 | Tashima et al. | |
| 2023/0005689 | A1* | 1/2023 | Komatsu ................ | H01H 50/18 |
| 2023/0005692 | A1* | 1/2023 | Tanimoto ............... | H01H 50/36 |

FOREIGN PATENT DOCUMENTS

| | | | |
|---|---|---|---|
| JP | 2007-109470 | A | 4/2007 |
| JP | 2019-192545 | A | 10/2019 |
| WO | 2016/038769 | A1 | 3/2016 |

* cited by examiner

ELECTROMAGNETIC RELAY DEVICE

CROSS-REFERENCE TO RELATED APPLICATION

The present application is a bypass continuation application of a currently pending international application No. PCT/JP2021/9580 filed on Mar. 10, 2021 designating the United States of America, the entire disclosure of which is incorporated herein by reference, the international application being based on and claiming the benefit of priority of Japanese Patent Application No. 2020-042232 filed on Mar. 11, 2020. The disclosure of the Japanese Patent Application No. 2020-042232 is incorporated in its entirety herein by reference.

TECHNICAL FIELD

The present disclosure relates to electromagnetic relay devices.

BACKGROUND

Typical electromagnetic relay devices are configured to cause a plunger and a movable member, which has at least one movable contact, to reciprocate based on electromagnetic attractive force generated by an energized solenoid to thereby cause the at least one movable contact to abut onto at least one stationary contact or separate therefrom. Abutment of the at least one movable contact onto the at least one stationary contact of such a typical electromagnetic relay enables the typical electromagnetic relay to be turned on, and separation of the at least one movable contact from the at least one stationary contact of such a typical electromagnetic relay enables the typical electromagnetic relay to be turned off.

An electromagnetic relay device disclosed in Japanese Patent Application Publication No. 2007-109470 includes a solenoid chamber in which a solenoid is disposed, and a contact chamber in which a first pair of a stationary contact and a movable contact and a second pair of a stationary contact and a movable contact are located. The electromagnetic relay device disclosed in the above patent publication also includes a diaphragm that partitions the solenoid chamber and the contact chamber from each other. This partitioning configuration aims to inhibit foreign particles in the solenoid chamber from entering the contact chamber.

SUMMARY

The reciprocation of the plunger causes the diaphragm to be deformed, so that the diaphragm imparts a resistance to the reciprocation of the plunger. This results in the reciprocation speed of the plunger being likely to decrease. From this viewpoint, although the published patent document has proposed measures against the decrease in the reciprocation speed of the plunger, the existence of the diaphragm may make it difficult to resolve the decrease in the reciprocation speed of the plunger. This may therefore make it difficult to eliminate a detrimental effect on speedy on-off operation of the electromagnetic relay device.

In view of the circumstances set forth above, one aspect of the present disclosure seeks to provide electromagnetic relay devices, each of which is capable of inhibiting foreign particles from entering between a pair of at least one stationary contact and at least one movable contact while reducing a detrimental effect on switching operations of the corresponding one of the electromagnetic relay devices.

A first exemplary measure of the present disclosure is an electromagnetic relay device. The electromagnetic relay device includes a mover including a movable contact movable to abut onto and separate from a stationary contact through a contact region defined between the movable contact and the stationary contact. The electromagnetic relay device includes a plunger configured to cause the mover to reciprocate to accordingly cause the movable contact to abut onto or separate from the stationary contact. The electromagnetic relay device includes a solenoid unit configured to cause the plunger to reciprocate in a predetermined reciprocation direction. The solenoid unit includes an electromagnetic coil configured to generate magnetic flux when energized, and a movable core having a slidable contact portion that has an outer peripheral surface. The movable core is configured to reciprocate based on energization of the electromagnetic coil. The solenoid unit includes a support member configured to slidably support the outer peripheral surface of the slidable contact portion of the movable core.

The electromagnetic relay device includes a movable wall member located between the slidable contact portion and the contact region. The movable wall member is linked to the plunger and configured to reciprocate together with the plunger. The movable wall member is arranged to occupy a region in the electromagnetic relay device. The region contains at least the slidable contact portion when viewed in the reciprocation direction.

A second exemplary measure of the present disclosure is an electromagnetic relay device. The electromagnetic relay device includes a mover including a movable contact movable to abut onto and separate from a stationary contact. The mover has a center and an outer periphery. The electromagnetic relay device includes a plunger configured to cause the mover to reciprocate to accordingly cause the movable contact to abut onto or separate from the stationary contact. The electromagnetic relay device includes a solenoid unit configured to cause the plunger to reciprocate in a predetermined reciprocation direction. The mover is located to be farther from the solenoid unit than the stationary contact is, and has a major surface that faces the solenoid unit.

The solenoid unit includes an electromagnetic coil configured to generate magnetic flux when energized, and a movable core having an outer peripheral surface and configured to reciprocate based on energization of the electromagnetic coil. The solenoid unit includes a support member configured to slidably support the outer peripheral surface of the movable core. The electromagnetic relay device includes a stationary-contact support configured to support the stationary contact and having a through hole formed therethrough. The plunger penetrates through the through hole. The electromagnetic relay device includes an inward wall mounted on the major surface of the mover to face inward. The inward wall is located closer to the outer periphery of the mover than the through hole is, and is located closer to the center of the mover than the movable contact is.

The movable wall member of the electromagnetic relay device according to the first exemplary measure is arranged to occupy the region in the electromagnetic relay device. The region contains at least the slidable contact portion when viewed in the reciprocation direction. This arrangement keeps, even if there are foreign particles at the slidable contact portion, the foreign particles from moving toward the contact region, thus inhibiting the foreign particles from entering into the contact region. In particular, the movable wall member is configured to reciprocate together with the plunger. This configuration reduces a detrimental effect due to the arrangement of the movable wall member on reciprocation of the plunger, making it possible to reduce a detrimental effect due to the arrangement of the movable wall member on speedy switching operations of the electromagnetic relay device.

The inward wall is mounted on the rearward major surface of the mover. Therefore, even if foreign particles at the slidable contact portion move onto the mover through the through hole of the stationary-contact support, the inward wall keeps the foreign particles from moving outward toward a contact region defined between the stationary contact and the movable contact. This therefore inhibits the foreign particles from entering into the contact region.

In particular, the inward wall is configured to reciprocate together with the mover. This configuration reduces a detrimental effect due to the configuration of the inward wall on reciprocation of the mover, making it possible to reduce a detrimental effect due to the configuration of the inward wall on speedy switching operations of the electromagnetic relay device.

As described above, the electromagnetic relay device according to each of the first and second exemplary measures keeps foreign particles from moving toward the contact region while reducing a detrimental effect on switching operations of the electromagnetic relay device.

Note that each parenthesized reference character assigned to a corresponding element in claims described later represents a relationship between the corresponding element and a corresponding specific measure described in embodiments described later, and therefore the parenthesized reference characters used in the claims should not be interpreted implying limitation.

BRIEF DESCRIPTION OF THE DRAWINGS

Other aspects of the present disclosure will become apparent from the following description of an embodiment with reference to the accompanying drawings in which.

DETAILED DESCRIPTION OF EMBODIMENTS

First Embodiment

The following describes an electromagnetic relay device 1 according to the first embodiment of the present disclosure with reference to FIGS. 1 to 6.

Figure 1:
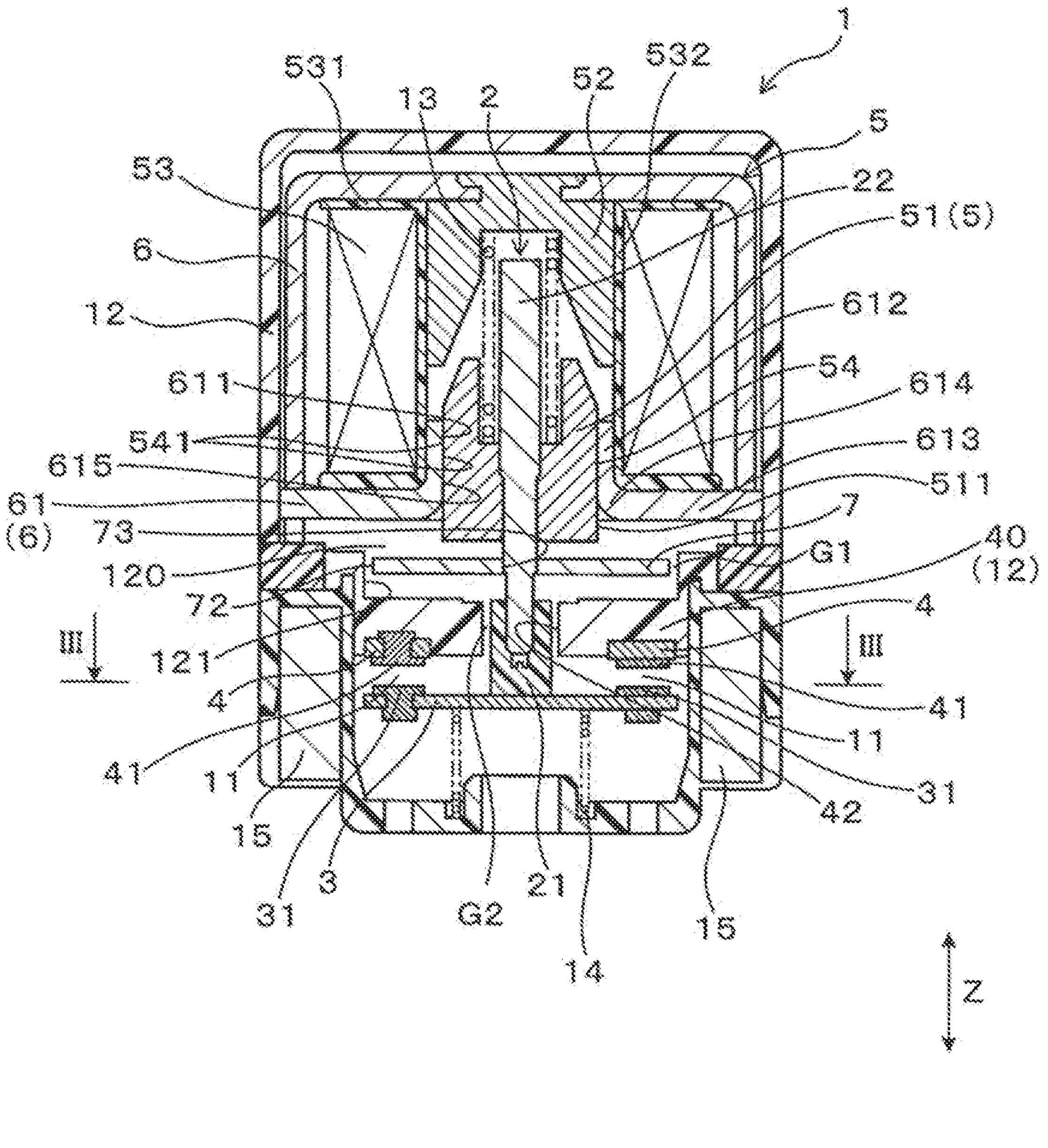
FIG. 1 is an axial cross-sectional view of an electromagnetic relay device according to the first embodiment with first to third movable contacts being respectively separated from first to third stationary contacts.
Figure 2:
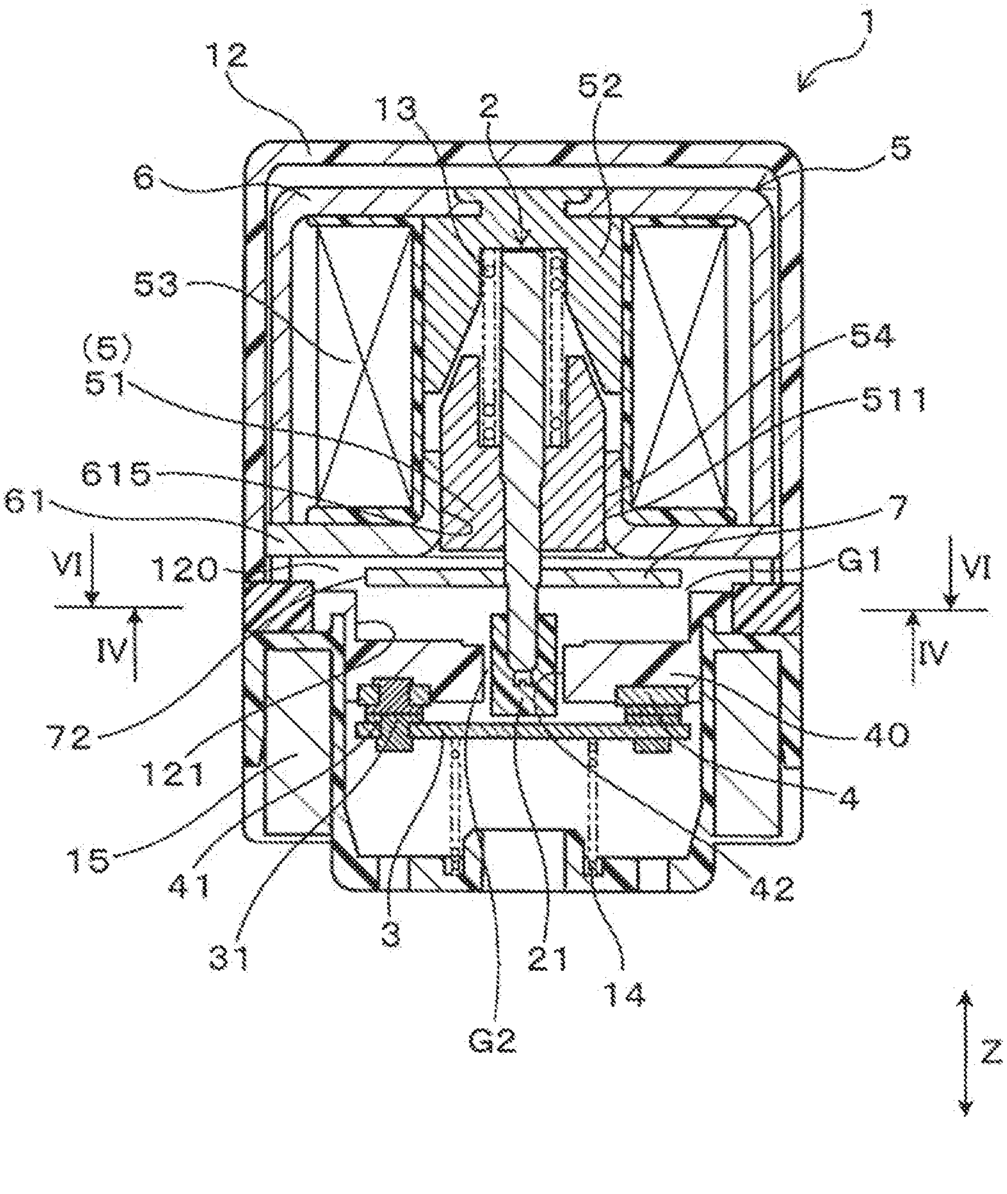
FIG. 2 is an axial cross-sectional view of the electromagnetic relay device according to the first embodiment with the first to third movable contacts respectively abutting onto the corresponding first to third stationary contacts.

Referring to FIGS. 1 and 2, the electromagnetic relay device 1 includes a plunger 2, a mover 3, a solenoid unit 3 for causing the plunger 2 to reciprocate, and three stationary contacts 41. The mover 3 includes three movable contacts 31 that are movable to abut onto and separate from the respective stationary contacts 41. That is, the reciprocation of the plunger 2 causes the mover 3 to reciprocate to accordingly cause the movable contacts 31 to abut onto or separate from the respective stationary contacts 41.

The solenoid unit 5 includes an electromagnetic coil 53, a movable core 51, and a support member 61. The electromagnetic coil 53 is configured to generate magnetic flux when energized. The movable core 51 is configured to reciprocate based on energization of the electromagnetic coil 53. The outer peripheral surface of the movable core 51 is slidably supported by the support member 61. That is, the movable core 51 has a slidable contact portion 54 that has an outer peripheral surface 511 that is in a slidable contact with the support member 61.

A direction in which the plunger 2 reciprocates, i.e., back-and-forth movement, will be referred to as a reciprocation direction Z. A contact region 11 is defined between the movable contacts 31 and the respective stationary contacts 41. A movable wall member 7 is located between the contact region 11 and the slidable contact portion 54 of the movable core 51. The movable wall member 7 is linked to the plunger 2 and configured to reciprocate together with the plunger 2.

Figure 4:
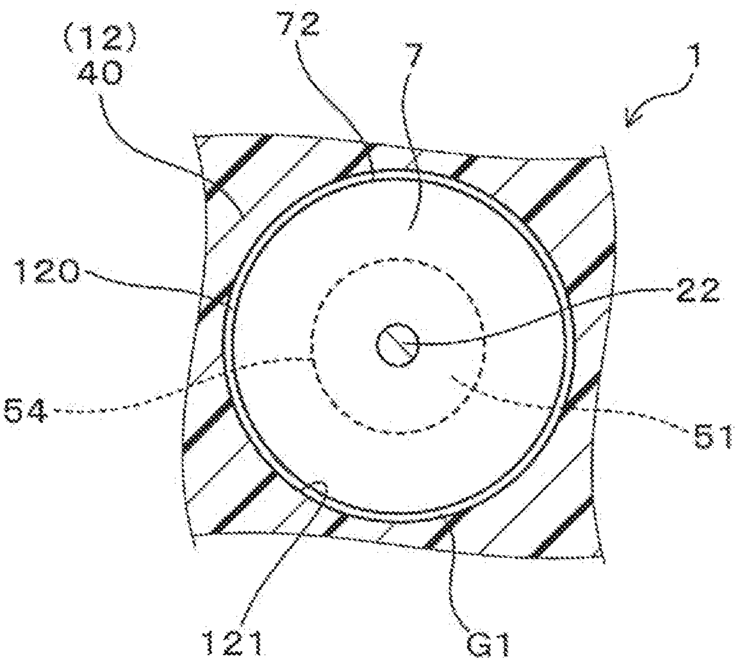
FIG. 4 is a transverse cross-sectional view taken along line IV-IV in FIG. 2.

As illustrated in FIG. 4, the movable wall member 7 is arranged to occupy a region in the electromagnetic relay device 1; the region contains at least the whole of the slidable contact portion 54 when viewed in the reciprocation direction Z.

The reciprocation direction Z in which the plunger 2 reciprocates may be sometimes referred to simply as a Z direction in the specification. The reciprocation direction Z has opposite first and second sides, the first side of the reciprocation direction Z in which the plunger 2 presses the mover 3 will be referred to as a forward direction, and the second side of the reciprocation direction Z, which is opposite to the first side of the reciprocation direction Z, will be referred to as a rearward direction.

The electromagnetic relay device 1 according to the first embodiment is arranged such that the forward direction is in agreement with the direction of gravity.

The electromagnetic relay device 1 can be used, for example, as a main relay for electric vehicles or hybrid vehicles or a main relay for charging.

Referring to FIGS. 1 and 2, the electromagnetic relay device 1 includes a housing 12 that has an inner peripheral surface 121 defining an inner chamber 120 thereinside; the mover 3, plunger 2, and solenoid unit are installed in the inner chamber 120. The movable wall member 7 has an outer peripheral edge 72, and the outer peripheral edge 72 of the movable wall member 7 extends, as illustrated in FIGS. 1 and 4, along a portion of the inner peripheral surface 121 of the housing 12; the portion of the inner peripheral surface 121 surrounds the outer peripheral edge 72 of the movable wall member 7. The housing 12 is made of, for example, an insulative material, such as one or more resin materials.

Figure 3:
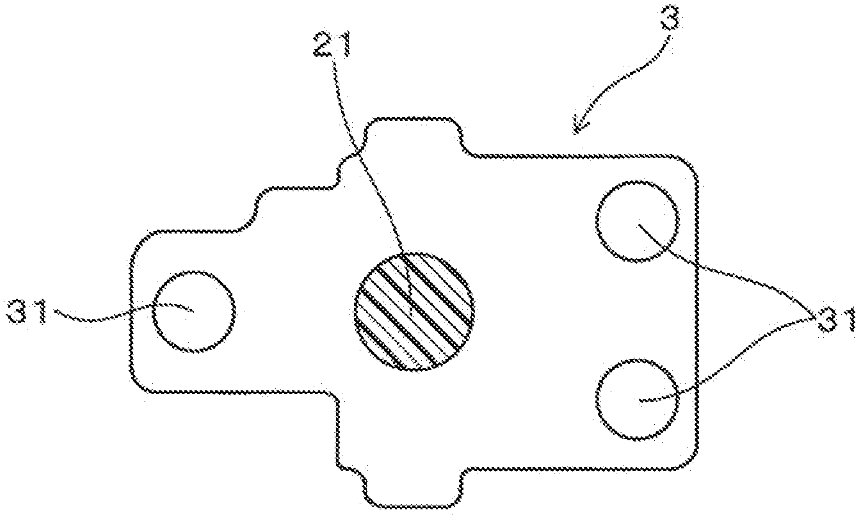
FIG. 3 is a transverse cross-sectional view taken along line III-III in FIG. 1.

The mover 3 of the first embodiment is, as illustrated in FIG. 3, comprised of a metallic plate-like member having electrical conductivity. The mover 3 has a predetermined length in a longitudinal direction thereof, and is comprised of the movable contacts 31 respectively mounted on opposing first and second longitudinal ends of a rearward major surface of the plate-like member of the mover 3. For example, two of the movable contacts 31, which will also be referred to as first movable contacts 31, are mounted on the first longitudinal end of the rearward major surface of the plate-like member of the mover 3, and the remaining one of the movable contacts 31, which will also be referred to as a second movable contact 31, is mounted on the second longitudinal end of the rearward major surface of the plate-like member of the mover 3.

The electromagnetic relay device 1 includes a rearward biasing member 14 interposed, as illustrated in FIG. 1, between the mover 3 and a portion of the housing 12; the portion of the housing 12 is arranged at a distance away from the mover 3 in the forward direction. The rearward biasing member 14 is configured to bias the mover 3 in the rearward direction. The rearward biasing member 14 of the first embodiment is, for example, comprised of a coil spring.

Figure 6:
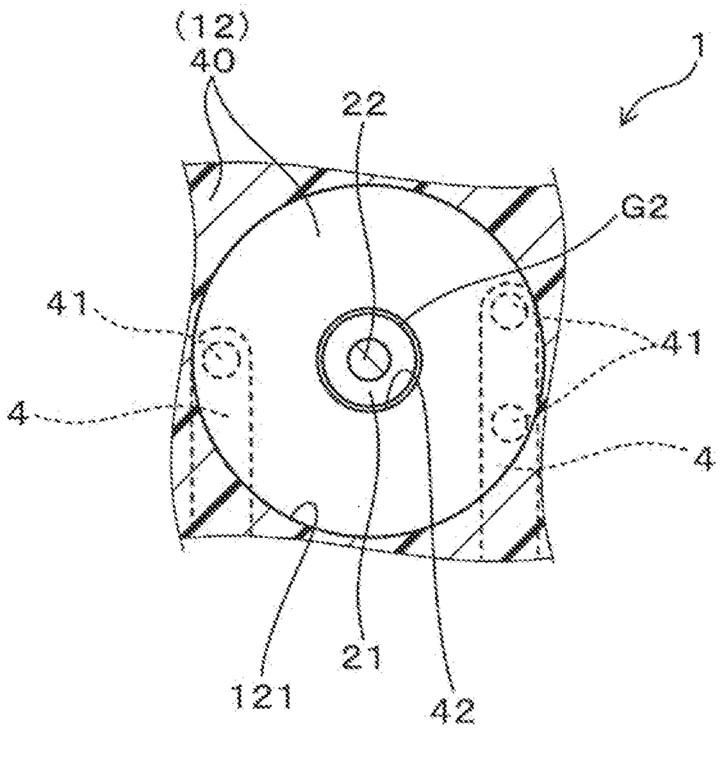
FIG. 6 is a transverse cross-sectional view taken along line VI-VI in FIG. 2.

The electromagnetic relay device 1 includes, as illustrated in FIGS. 1 and 6, first and second stationary busbars 4, each of which is comprised of a metallic plate-like member having electrical conductivity. Two of the stationary contacts 41 are mounted on the first stationary busbar 41, and the remaining one of the stationary contacts 41 is mounted on the second stationary busbar 41.

The first stationary busbar 41 is arranged in the housing 12 such that the two stationary contacts 41, which will also be referred to as first stationary contacts 41, face the respective first movable contacts 31 mounted on the first longitudinal end of the rearward major surface of the plate-like member of the mover 3 in the rearward direction. Similarly, the second stationary busbar 41 is arranged in the housing 12 such that the one stationary contact 41, which will also be referred to as a second stationary contact 41, faces the second movable contact 31 mounted on the second longitudinal end of the rearward major surface of the plate-like member of the mover 3 in the rearward direction.

The electromagnetic relay device 1 includes a stationary-contact support 40 constituting a part of the housing 12. The first and second stationary busbars 41 are fixed to the stationary-contact support 40. A portion of each of the first and second busbars 41 is drawn out externally from the inside of the housing 12, and the drawn-out portion of each of the first and second busbars 41 is electrically connected to, for example, a corresponding one of external wires.

Forward movement of the plunger 2 in the forward direction pushes the mover 3 to cause the mover 3 to move in the forward direction against the biasing force of the rearward biasing member 14. The solenoid unit 5 serves to cause the plunger 2 to reciprocate in the reciprocation direction Z.

The solenoid unit 5 includes, as illustrated in FIG. 1, a stationary core 52 and a yoke 6 including the support member 61 in addition to the electromagnetic coil 53 and the movable core 51. Energization of the electromagnetic coil 53 causes the electromagnetic coil 53 to generate magnetic flux through a magnetic path that is comprised of the stationary core 52, movable core 51, and the yoke 6 including the support member 61. The plunger 2 is comprised of a shaft member 22 described later, and the shaft member 22 of the plunger 2 can be made of magnetic metal, such as magnetic stainless steel; this configuration of the shaft member 22 enables the shaft member 22 to constitute a part of the magnetic path.

The electromagnetic coil 53 is fixedly installed in the housing 12. The electromagnetic coil 53 is comprised of a cylindrical tubular bobbin 531, which has a cylindrical tubular body 532, and a wire wound around an outer peripheral surface of the cylindrical tubular body 532 of the bobbin 531. The cylindrical tubular body 532 has an inner cylindrical hollow defined thereinside, and the inner cylindrical hollow has both opening ends toward the respective forward and rearward directions of the Z direction. A part of the plunger 2 is arranged in the inner cylindrical hollow of the cylindrical tubular body 532.

The stationary core 52, which is made of soft magnetic metal, is arranged inside the cylindrical tubular body 532 of the electromagnetic coil 53 to face the movable core 51 in the Z direction. In other words, the stationary core 52 is located at the back side of the movable core 51.

The electromagnetic relay device 1 includes a forward biasing member 13 interposed between the stationary core 52 and the movable core 51. The forward biasing member 13, which is comprised of for example a coil spring according to the first embodiment, is configured to bias the movable core 51 to move the movable core 51 toward the stationary core 52 in the forward direction. That is, the forward biasing member 13 biases the movable core 51 to thereby bias the plunger 2 in the forward direction.

Figure 5:
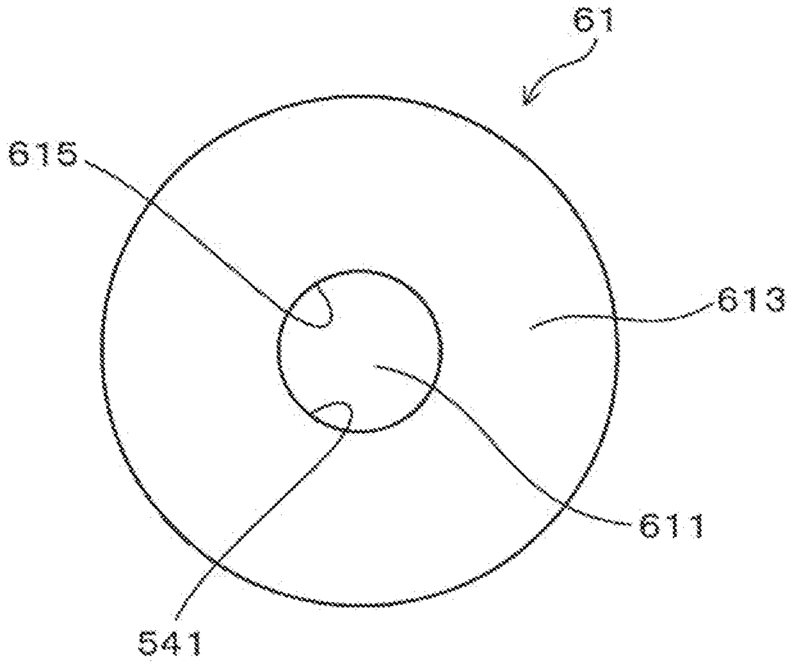
FIG. 5 is a plan view of a support member of the electromagnetic relay device according to the first embodiment when viewed from a forward side of the electromagnetic relay device.

The yoke 6 is arranged to surround the electromagnetic coil 53. The support member 61 constitutes a part of the yoke 6. The support member 61 has, as illustrated in FIGS. 1 and 5, a slide contact hole 611 formed therethrough in the reciprocation direction Z. That is, the support member 61 has, as illustrated in FIG. 5, a ring shape when viewed in the reciprocation direction Z.

The movable core 51 is, as illustrated in FIGS. 1 and 2, slidably disposed in the slid contact hole 611. That is, the support member 61 has an inner peripheral surface 615 defining the slide contact hole 611 thereinside. The outer peripheral surface 511 of the slidable contact portion 54 of the movable core 51 is in slidable contact with the inner peripheral surface 615 of the support member 61.

The support member 61 is comprised of, as illustrated in FIG. 1, an inner peripheral wall portion 612, an annular wall portion 613, and a corner portion 614. The inner peripheral wall portion 612 has a substantially tubular shape extending in parallel to the Z direction. The annular wall portion 613 has an annular plate-like shape extending outward from a forward end of the inner peripheral wall portion 612 through the corner portion 614. The annular wall portion 613 covers the forward side of the electromagnetic coil 53. The corner portion 614 is curvedly bent to join the forward end of the inner peripheral wall portion 612 and an inner peripheral edge of the annular wall portion 613 to each other.

That is, the inner peripheral wall portion 612 of the support member 61 defines the slide contact hole 611 thereinside. Each of the inner peripheral surface 615 of the support member 61 and the outer peripheral surface 511 of the slidable contact portion 54 of the movable core 51 has an insulative coating layer 541, which has a low friction coefficient, formed thereon. The coating layer 541 is made of, for example, fluororesin, such as Teflon®.

The plunger 2 of the first embodiment includes, as illustrated in FIG. 1, an insulator member 21 in addition to the movable core 51 and the shaft member 22. The shaft member 22 is made of magnetic metal, but can be made of nonmagnetic metal. The plunger 2 can be comprised of only the movable core 51 and the insulator member 21.

The movable core 51 has a through hole formed therethrough, and is fixed to the shaft member 22 while the shaft member 22 penetrates through the through hole of the movable core 51. This configuration enables the movable core 51 and the shaft member 22 to move together. The movable core 51 is made of soft magnetic metal, and has a rearward end that is shaped to taper in the rearward direction, i.e., to have a smaller diameter while being closer to the stationary core 52 in the rearward direction. The tapered shape of the movable core 51 is configured to conform with a corresponding tapered shape of a forward end of the stationary core 52. At least part of the movable core 51 is disposed in the hollow of the cylindrical tubular body 532.

The insulator member 21 is mounted at a forward end of the shaft member 22 of the plunger 2. Forward movement of the insulator member 21 of the plunger 2 presses the mover 3 in the forward direction. The insulator member 21 is made of an insulative material, such as one or more resin materials.

The stationary-contact support 40 has a through hole 42 formed therethrough and located inside the stationary-contact support 40. At least part of the plunger 2 is disposed in the through hole 42. The forward end of the shaft member 22 and the insulator member 21 are disposed in the through hole 42 according to the first embodiment. The insulator member 21 is configured to reciprocate in the Z direction while being placed in the through hole 42. As illustrated in FIGS. 1, 2, and 6, the stationary-contact support 40 has an inner peripheral surface defining the through hole 42 thereinside, and the insulator member 21 has an outer peripheral surface. The inner peripheral surface of the through hole 42 of the stationary-contact support 40 and the outer peripheral surface of the insulator member 21 are arranged to face each other with an annular clearance G2 therebetween.

The movable wall member 7 is fixed to the shaft member 22 of the plunger 2 while the shaft member 22 penetrates through the movable wall member 7. That is, the movable wall member 7 has a press-fit hole 73 formed therethrough, and the shaft member 22 of the plunger 2 is pressed to fixedly fit in the press-fit hole 73 while penetrating therethrough. The movable wall member 7 has, as illustrated in FIG. 4, an annular shape when viewed in the Z direction.

As described above, the movable wall member 7 is arranged to occupy the region in the electromagnetic relay device 1; the region contains at least the whole of the slidable contact portion 54 when viewed in the reciprocation direction Z.

The movable wall member 7 has a disk shape, and the outer peripheral edge 72 of the movable wall member 7 is, as illustrated in FIG. 1, located outside both the outer peripheral surface of the slidable contact portion 54 and the inner peripheral surface of the through hole 42. The movable wall member 7 of the first embodiment is made of metal, such as iron alloy.

As described above, the outer peripheral edge 72 of the movable wall member 7 extends, as illustrated in FIGS. 1 and 4, along the portion of the inner peripheral surface 121 of the housing 12; the portion of the inner peripheral surface 121 surrounds the outer peripheral edge 72 of the movable wall member 7. The outer peripheral edge 72 of the movable wall member 7 and the surrounding portion of the inner peripheral surface 121 are arranged to face each other with an annular clearance G1 therebetween.

The movable wall member 7 has a predetermined thickness in the Z direction, and the annular clearance G1 has a radial width that is smaller than or equal to the predetermined thickness of the movable wall member 7 in the Z direction.

Next, the following describes how the plunger 2 operates in response to energization or de-energization of the electromagnetic coil 53.

Energization of the electromagnetic coil 53 causes magnetic flux to flow through the magnetic path that is comprised of the stationary core 52, movable core 51, the yoke 6 including the support member 61, and the shaft 22. The magnetic flux generates magnetic attractive force between the movable core 51 and the stationary core 52. The generated magnetic attractive force causes, as illustrated in FIG. 2, the plunger 2, which includes the movable core 51, to be magnetically attracted to the stationary core 52 against the biasing force of the forward biasing member 13 in the rearward direction, resulting in the plunger 2 moving in the rearward direction. The biasing force of the rearward biasing member 14 therefore causes the mover 3 to move in the rearward direction with the rearward movement of the plunger 2, resulting in the movable contacts 31 abutting onto the respective stationary contacts 41. This causes the electromagnetic relay device 1 to be switched on. This enables a current to flow from one of the first and second busbars 4 to the other thereof through the mover 3. The switch-on state of the electromagnetic relay device 1 maintains the insulator member 21 in a separate state from the mover 3.

Next, de-energization of the electromagnetic coil 53, which is in an energized state, causes the magnetic attractive force between the movable core 51 and the stationary core 52 to disappear. Because the biasing force of the forward biasing member 13 is set to be larger than the biasing force of the rearward biasing member 14 according to the first embodiment, the forward biasing member 13 causes the movable core 51 to move in the forward direction due to there being no magnetic attractive force between the movable core 51 and the stationary core 52. The forward movement of the movable core 51 causes the plunger 2 to push the mover 3 in the forward direction, so that the mover 3 moves away from the stationary contacts 41.

This results in the movable contacts 31 being separated from the respective stationary contacts 41. This causes the electromagnetic relay device 1 to be switched off.

When the electromagnetic relay device 1 is changed from the switch-on state to the switch-off state, the electromagnetic relay device 1 is kept in the switch-on state while an electrical arc is generated in the contact region 11. In order to extend the length of the electrical arc to thereby extinguish the electrical arc, the electromagnetic relay device 1 includes an arc-extinction magnet 15 located radially outside the contact region 11. The arc-extinction magnet 15 causes the electrical arc created in the contact region 11 to extend in a direction orthogonal to the reciprocation direction of the mover 3, thus extinguishing the electrical arc.

Next, the following describes how the electromagnetic relay device 1 according to the first embodiment works.

The movable wall member 7 of the electromagnetic relay device 1 is arranged to occupy the region in the electromagnetic relay device 1; the region contains at least the slidable contact portion 54 when viewed in the reciprocation direction Z. This arrangement keeps, even if there are foreign particles at the slidable contact portion 54, the foreign particles from moving toward the contact region 11, thus inhibiting the foreign particles from entering into the contact region 11. In particular, the movable wall member 7 is configured to reciprocate together with the plunger 2. This configuration reduces a detrimental effect due to the arrangement of the movable wall member 7 on reciprocation of the plunger 2, making it possible to reduce a detrimental effect due to the arrangement of the movable wall member 7 on speedy switching operations of the electromagnetic relay device 1.

Figure 7:
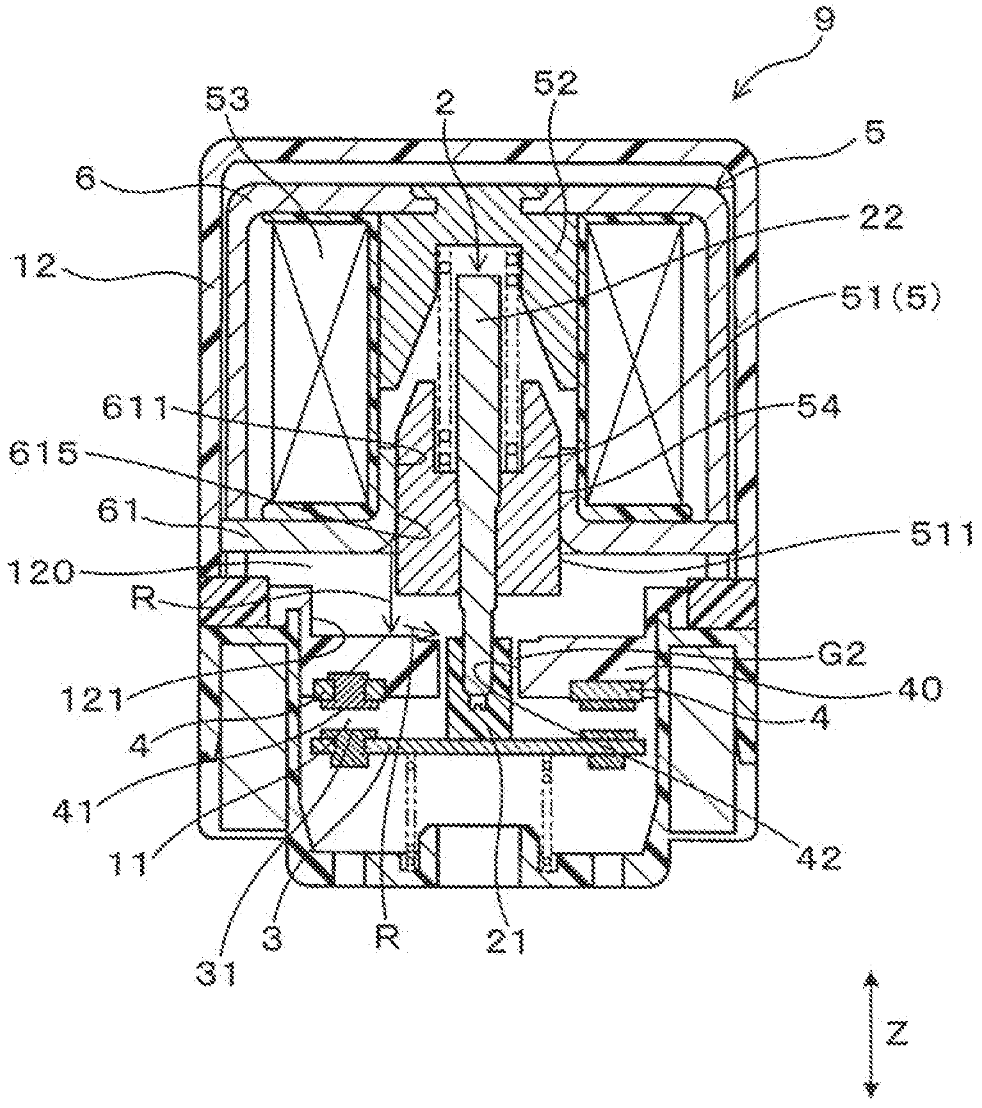
FIG. 7 is an axial cross-sectional view of an electromagnetic relay device according to a comparison example, which shows how foreign particles move in the electromagnetic relay according to the comparison example.

For the sake of comparison with the electromagnetic relay device 1, FIG. 7 illustrates an electromagnetic relay device 9 according to a comparison example; the electromagnetic relay device 9 includes no movable wall member 7. As illustrated in FIG. 7, if there are foreign particles at the slidable contact portion 54, the foreign particles are likely to fall directly onto the stationary-contact support 40 (see arrow R in FIG. 7). In particular, some foreign particles are likely to fall onto a portion of the stationary-contact support 40; the portion of the stationary-contact support 40 is located adjacent to the through hole 42. The foreign particles, which have fallen onto the portion of the stationary-contact support 40, may therefore pass through the through hole 2 onto the mover 3, resulting in entering into the contact region 11.

Figure 8:
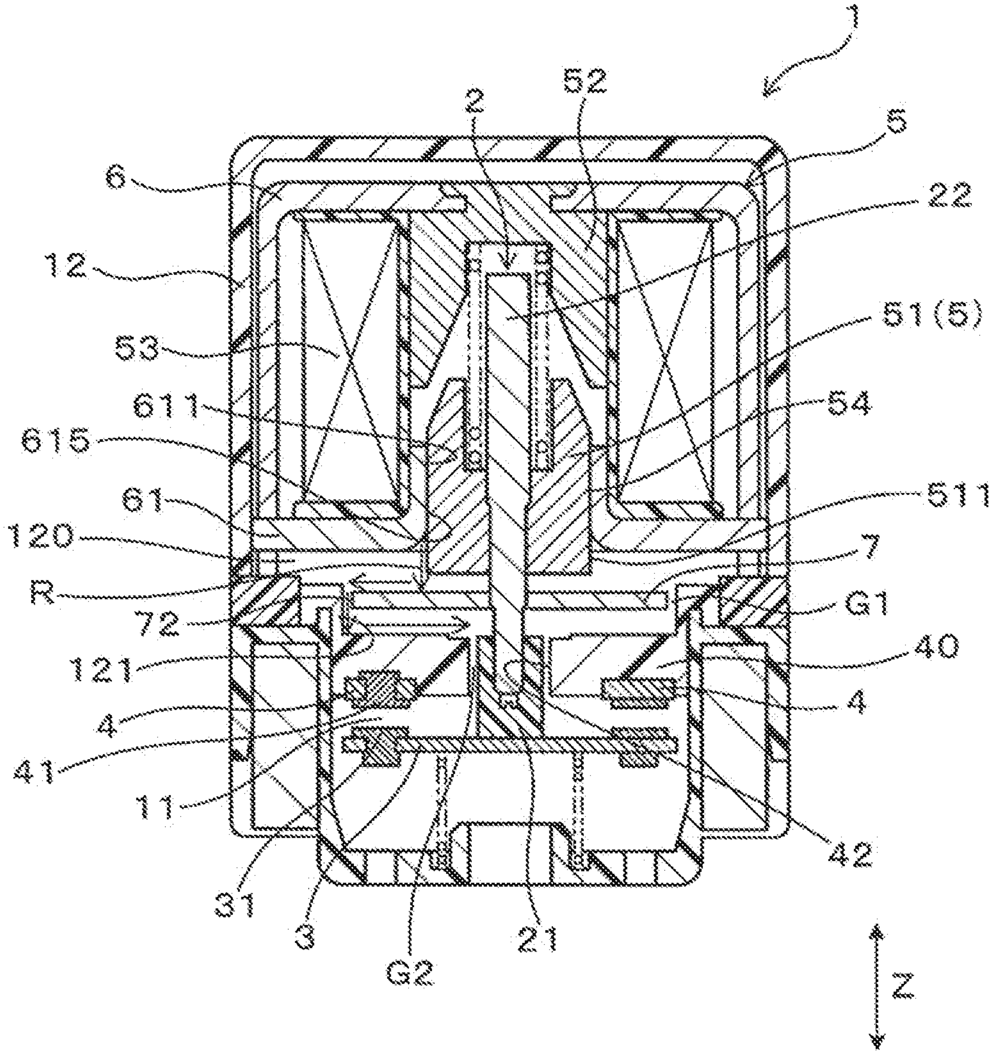
FIG. 8 is an axial cross-sectional view of the electromagnetic relay device according to the first embodiment, which shows how foreign particles move in the electromagnetic relay according to the first embodiment.
Figure 9:
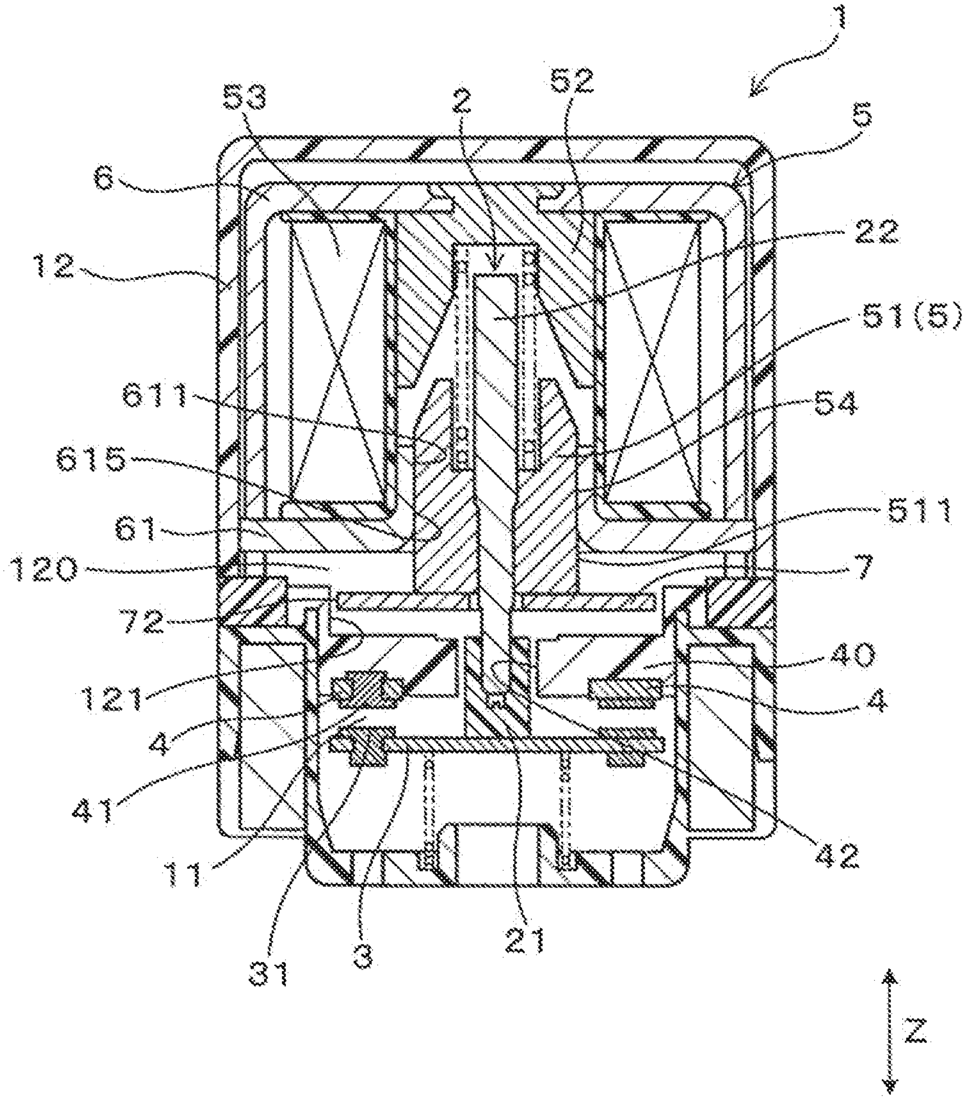
FIG. 9 is an axial cross-sectional view of an electromagnetic relay device according to the second embodiment.
Figure 10:
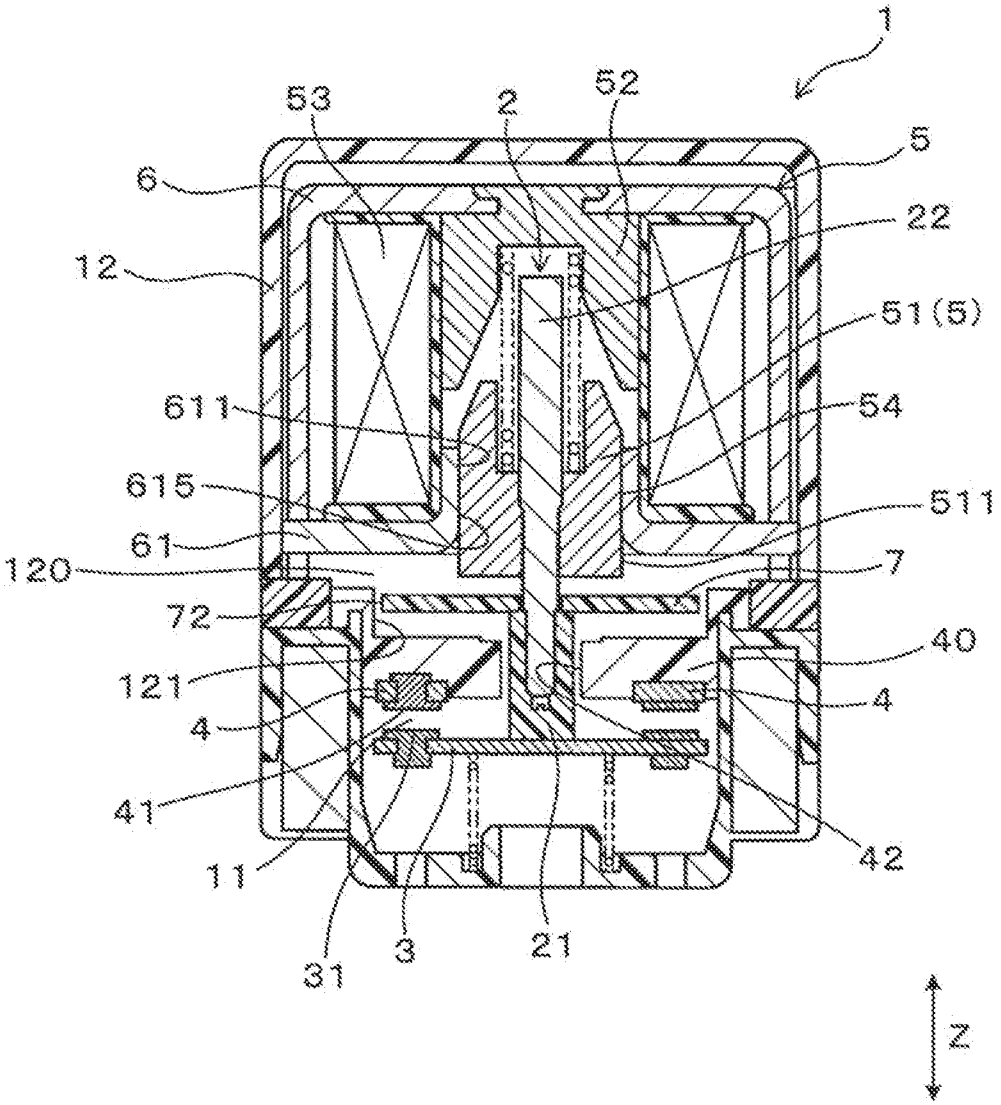
FIG. 10 is an axial cross-sectional view of an electromagnetic relay device according to the third embodiment.

In contrast, as illustrated in FIG. 8, even if there are foreign particles at the slidable contact portion 54, the arrangement of the movable wall member 7 of the electromagnetic relay device 1 according to the first embodiment enables the foreign particles to fall onto the movable wall member 7 (see arrow R in FIG. 8). It is therefore not until the foreign particles, which have fallen onto the movable wall member 7, move radially outside the outer peripheral edge 72 of the movable wall member 7 and pass through the clearance G1 between the outer peripheral edge 72 of the movable wall member 7 and the surrounding portion of the inner peripheral surface 121 that the foreign particles fall onto the stationary-contact support 40. Additionally, even if the foreign particles fall onto the stationary-contact support 40, the arrangement of the movable wall member 7 results in the fallen positions of the foreign particles being at a sufficiently distant location from the through hole 42.

That is, even if there are foreign particles at the slidable contact portion 54, the movable wall member 7 keeps the foreign particles from moving toward the contact region 11.

The movable wall member 7 fixedly mounted to the plunger 2 is configured to reciprocate together with the plunger 2 without interfering with other parts of the electromagnetic relay device 1. This configuration results in the other parts of the electromagnetic relay device 1 being unlikely to impart a resistance to the reciprocation of the plunger 2, making it possible to reduce a detrimental effect due to the arrangement of the movable wall member 7 on the reciprocation of the plunger 2.

The outer peripheral edge 72 of the movable wall member 7 extends along the surrounding portion of the inner peripheral surface 121 of the housing 12. This results in the clearance G1 between the outer peripheral edge 72 and the surrounding portion of the inner peripheral surface 121 being as narrow as possible, making it possible to further block movement of the foreign particles toward the contact region 11.

Each of the inner peripheral surface 615 of the support member 61 and the outer peripheral surface 511 of the slidable contact portion 54 of the movable core 51 has the insulative coating layer 541, which has a low friction coefficient, formed thereon. This results in the friction resistance of the slidable contact portion 54 being as low as possible, enabling reciprocation of the plunger 2 to be smoother. If insulative foreign particles due to the coating layers 541 entered into the contact region 11, there might be poor connections between the movable contacts 31 and the stationary contacts 41.

From this viewpoint, the movable wall member 7 of the electromagnetic relay device 1 according to the first embodiment blocks movement of the insulative foreign particles toward the contact region 11, making it possible to prevent poor connections between the movable contacts 31 and the stationary contacts 41.

As described in detail above, the electromagnetic relay device 1 according to the first embodiment keeps foreign particles from moving toward the contact region 11 while reducing a detrimental effect on switching operations of the electromagnetic relay device 1.

Second Embodiment

In comparison with the electromagnetic relay device 1 according to the first embodiment, the electromagnetic relay device 1 according to the second embodiment is modified such that the movable wall member 7 is mounted to the movable core 51. For example, the movable wall member 7 is formed as an assembly of the movable core 51 and the movable wall member 7, so that the movable wall member 7 constitutes a part of the movable core 51.

The other components of the electromagnetic relay device 1 according to the second embodiment are substantially identical to the corresponding respective components of the electromagnetic relay device 1 according to the first embodiment.

To each of components described in the first and subsequent embodiments, which are substantially identical or equivalent to each other, a corresponding common reference character will be assigned unless specific information is added to the corresponding component.

The movable wall member 7 mounted to the movable core 51 keeps foreign particles from moving toward the contact region 11 while reducing the number of component of the electromagnetic relay device 1.

The electromagnetic relay device 1 according to the second embodiment offers additional advantageous effects that are identical to those offered by the electromagnetic relay device 1 according to the first embodiment.

The movable wall member 7 and the movable core 51 can be configured as individual components, and the movable wall member 7 can be adhered to a forward end surface of the movable core 51.

Third Embodiment

In comparison with the electromagnetic relay device 1 according to the first embodiment, the electromagnetic relay device 1 according to the third embodiment is modified such that the movable wall member 7 is mounted to the insulator member 21. For example, the movable wall member 7 is formed as an assembly of the insulator member 21 and the movable wall member 7, so that the movable wall member 7 constitutes a part of the insulator member 21.

The other components of the electromagnetic relay device 1 according to the third embodiment are substantially identical to the corresponding respective components of the electromagnetic relay device 1 according to the first embodiment.

The movable wall member 7 mounted to the insulator member 21 keeps foreign particles from moving toward the contact region 11 while reducing the number of component of the electromagnetic relay device 1.

The electromagnetic relay device 1 according to the third embodiment offers additional advantageous effects that are identical to those offered by the electromagnetic relay device 1 according to the first embodiment.

The movable wall member 7 and the insulator member 21 can be configured as individual components, and the movable wall member 7 can be adhered to a rearward end surface of the insulator member 21.

Fourth Embodiment

In comparison with the electromagnetic relay device 1 according to the first embodiment, the electromagnetic relay device 1 according to the fourth embodiment is modified such that protruding wall members 71 are mounted to the movable wall member 7.

Figure 11:
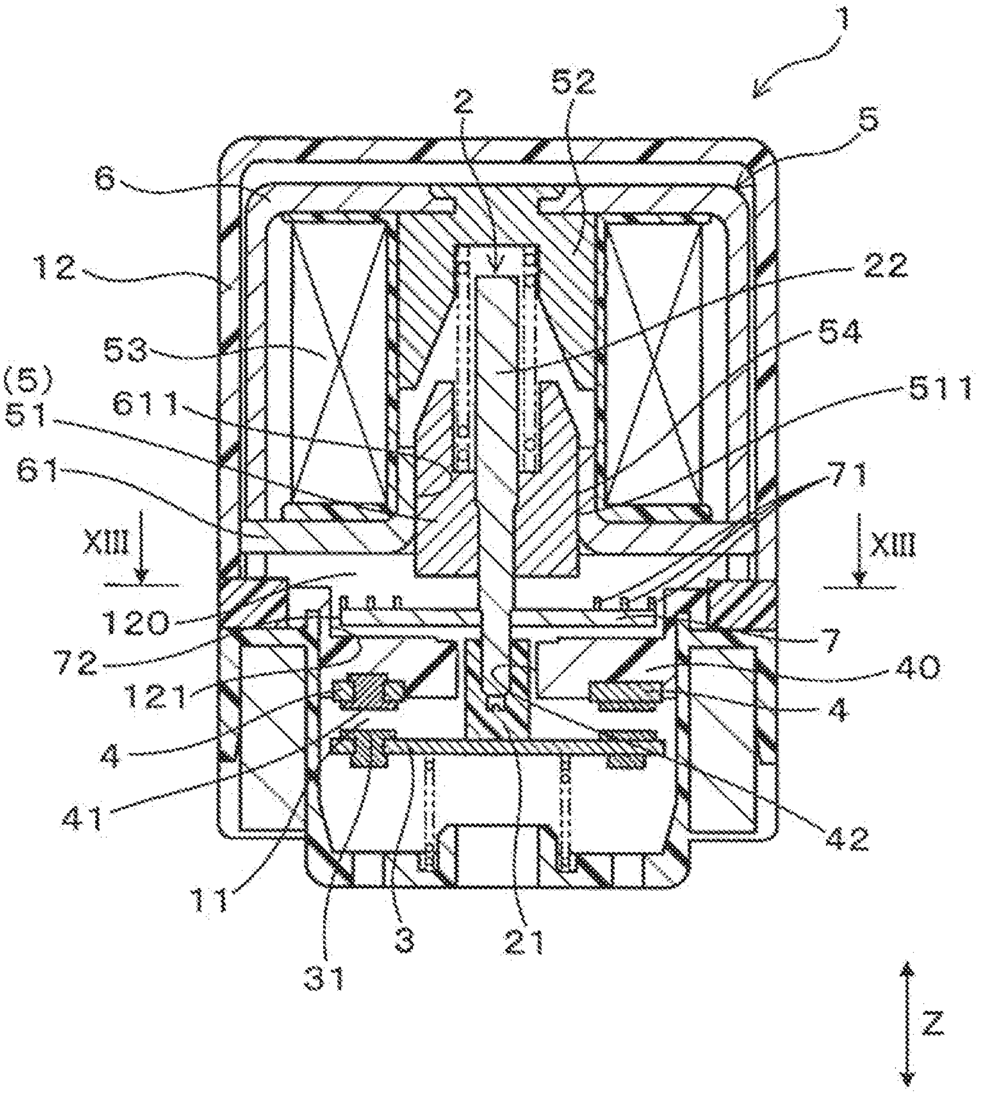
FIG. 11 is an axial cross-sectional view of an electromagnetic relay device according to the fourth embodiment with the first to third movable contacts being respectively separated from the first to third stationary contacts.
Figure 12:
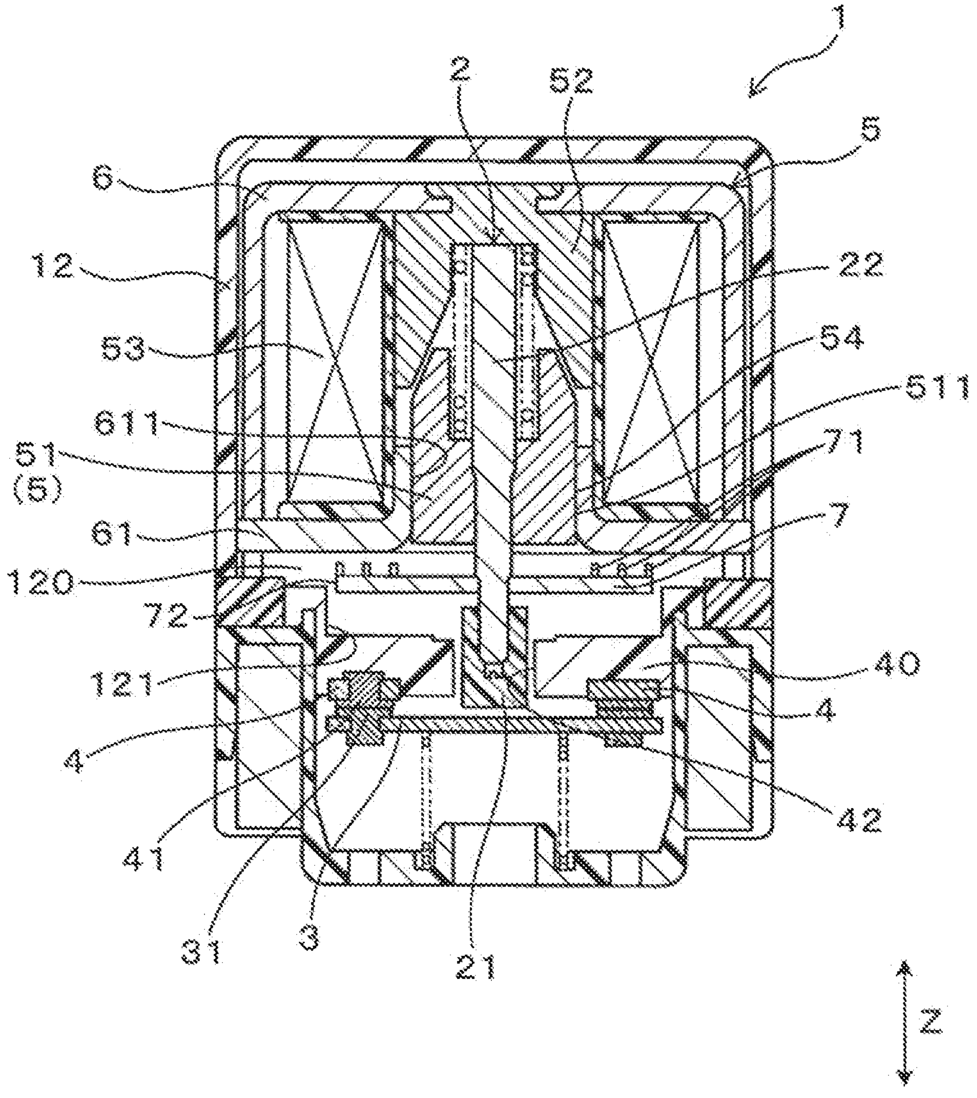
FIG. 12 is an axial cross-sectional view of the electromagnetic relay device according to the fourth embodiment with the first to third movable contacts respectively abutting onto the corresponding first to third stationary contacts.
Figure 13:
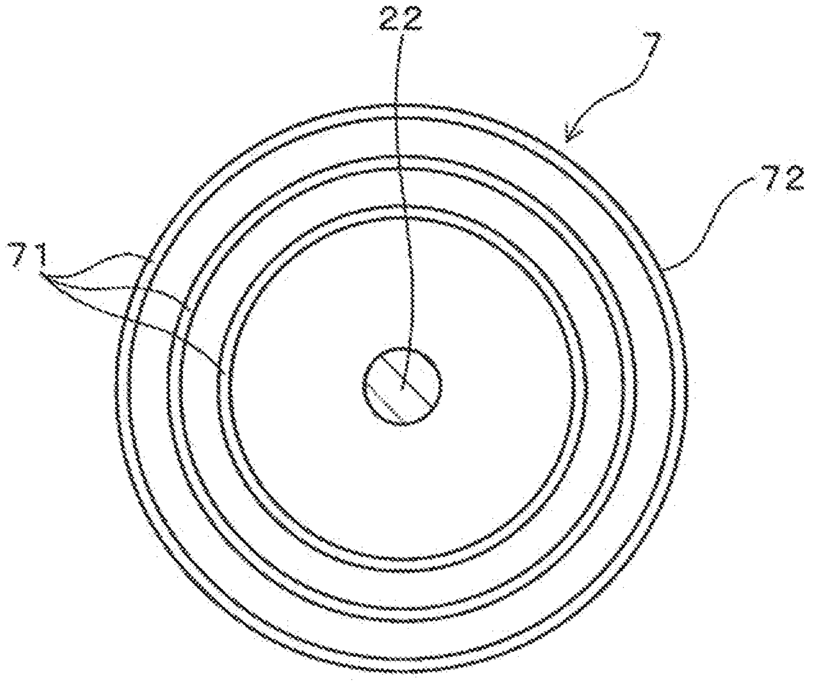
FIG. 13 is a transverse cross-sectional view taken along line XIII-XIII in FIG. 11.
Figure 14:
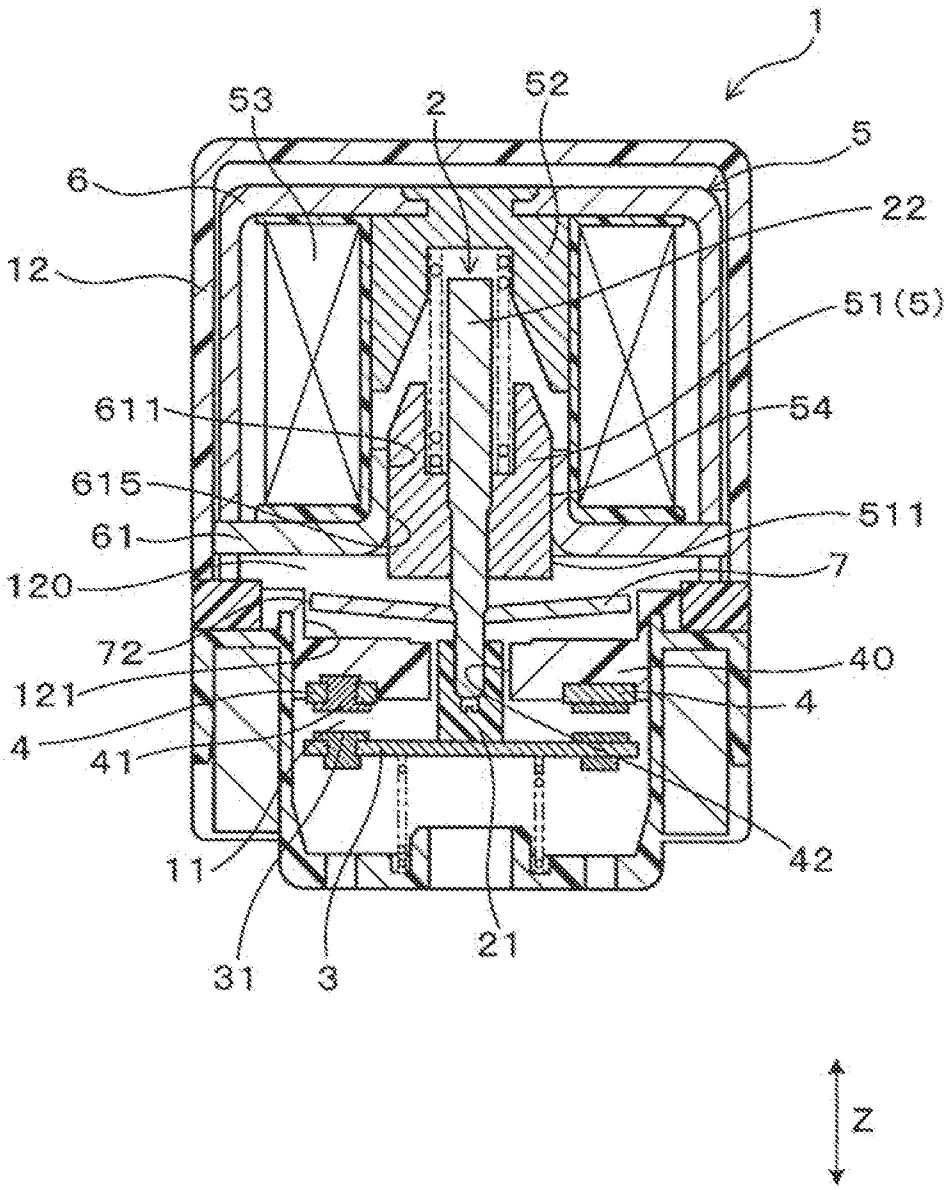
FIG. 14 is an axial cross-sectional view of an electromagnetic relay device according to the fifth embodiment.

Specifically, as illustrated in FIGS. 11 to 13, the movable wall member 7 has a rearward major surface that faces the slidable contact portion 54, and the protruding wall members 71 are mounted on an outer region of the rearward major surface of the movable wall member 7 to protrude in the rearward direction; the outer region is located closer to an outer periphery of the movable wall member 7 than the slidable contact portion 54 is.

For example, as illustrated in FIG. 13, three protruding wall members 71, each of which has an annular shape, are mounted to the outer region of the rearward major surface of the movable wall member 7. A single protruding wall member 71, two protruding wall members 71, or four or more protruding wall members 71 can be mounted on the outer region of the rearward major surface of the movable wall member 7. Each of the protruding wall members 71 can be designed to have any shape other than the annular shape. For example, each of the protruding wall members 71 can have a circular-arc shape, and the circular-arc protruding wall members 71 can be mounted on the outer region of the rearward major surface of the movable wall member 7 to have an annular shape.

Each of the annular protruding wall members 71 has an inner peripheral surface, and the inner peripheral surfaces of the respective annular protruding wall members 71 are located closer to the outer periphery of the movable wall member 7 than the slidable contact portion 54 is.

The protruding wall members 71 according to the fourth embodiment prevent, as illustrated in FIG. 12, the movable wall member 7 from abutting onto the support member 61 when the plunger 2 moves in the rearward direction.

The other components of the electromagnetic relay device 1 according to the fourth embodiment are substantially identical to the corresponding respective components of the electromagnetic relay device 1 according to the first embodiment.

The protruding wall members 71 are mounted on the outer region of the rearward major surface of the movable wall member 7; the outer region is located closer to the outer periphery of the movable wall member 7 than the slidable contact portion 54 is. This configuration results in, even if foreign particles at the slidable contact portion 54 fall onto the rearward major surface of the movable wall member 7, the foreign particles being unlikely to move radially outside the protruding wall members 71. This therefore makes it possible to further block movement of the foreign particles toward the contact region 11.

The electromagnetic relay device 1 according to the fourth embodiment offers additional advantageous effects that are identical to those offered by the electromagnetic relay device 1 according to the first embodiment.

Grooves can be mounted on an inner region of the rearward major surface of the movable wall member 7; the inner region is located inside the slidable contact portion 54.

Fifth Embodiment

In comparison with the electromagnetic relay device 1 according to the first embodiment, the electromagnetic relay device 1 according to the fifth embodiment is modified such that the configuration of the movable wall member 7 is changed from the configuration of the movable wall member 7 according to the first embodiment.

The other components of the electromagnetic relay device 1 according to the fifth embodiment are substantially identical to the corresponding respective components of the electromagnetic relay device 1 according to the first embodiment.

Specifically, the movable wall member 7 according to the fifth embodiment is configured to radially extend from the radially inner peripheral edge to the outer peripheral edge 72 while being inclined such that the outer peripheral edge 72 is located rearmost in the rearward direction.

This configuration of the movable wall member 7 results in, even if foreign particles at the slidable contact portion 54 fall onto the movable wall member 7, the foreign particles being unlikely to move radially outward. This therefore makes it possible to efficiently block movement of the foreign particles toward the contact region 11.

The electromagnetic relay device 1 according to the fifth embodiment offers additional advantageous effects that are identical to those offered by the electromagnetic relay device 1 according to the first embodiment.

Sixth Embodiment

In comparison with the electromagnetic relay device 1 according to the first embodiment, the electromagnetic relay device 1 according to the sixth embodiment is modified such that first and second inward walls 32 are mounted to the mover 3 without the movable wall member 7.

The mover 3 is located to be farther from the solenoid unit 5 than the stationary contacts 41 are. The stationary-contact support 40 has the through hole 42 formed therethrough. The plunger 2 penetrates through the through hole 42 of the stationary-contact support 40.

Figure 15:
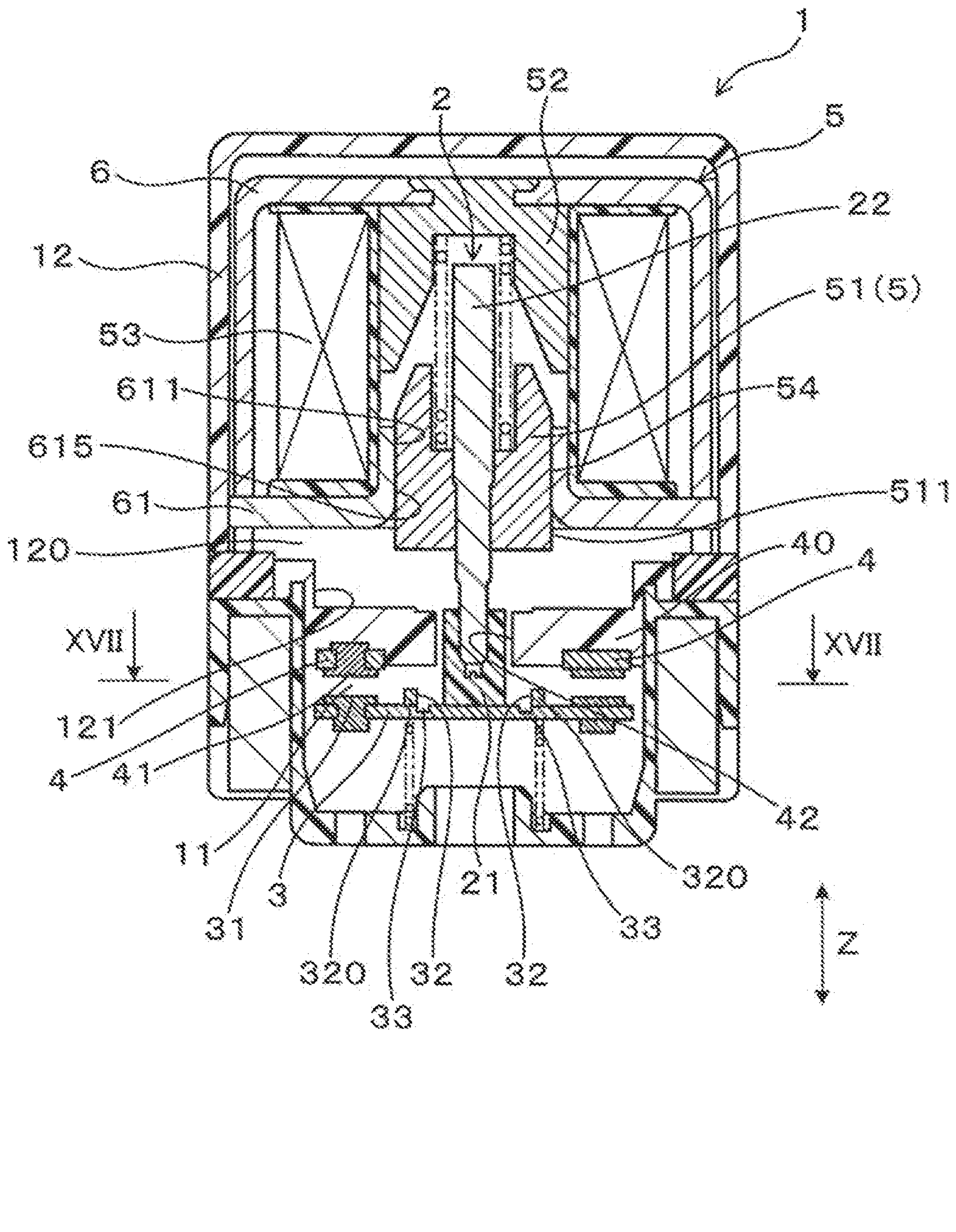
FIG. 15 is an axial cross-sectional view of an electromagnetic relay device according to the sixth embodiment with the first to third movable 6, contacts being respectively separated from the first to third stationary contacts.
Figure 16:
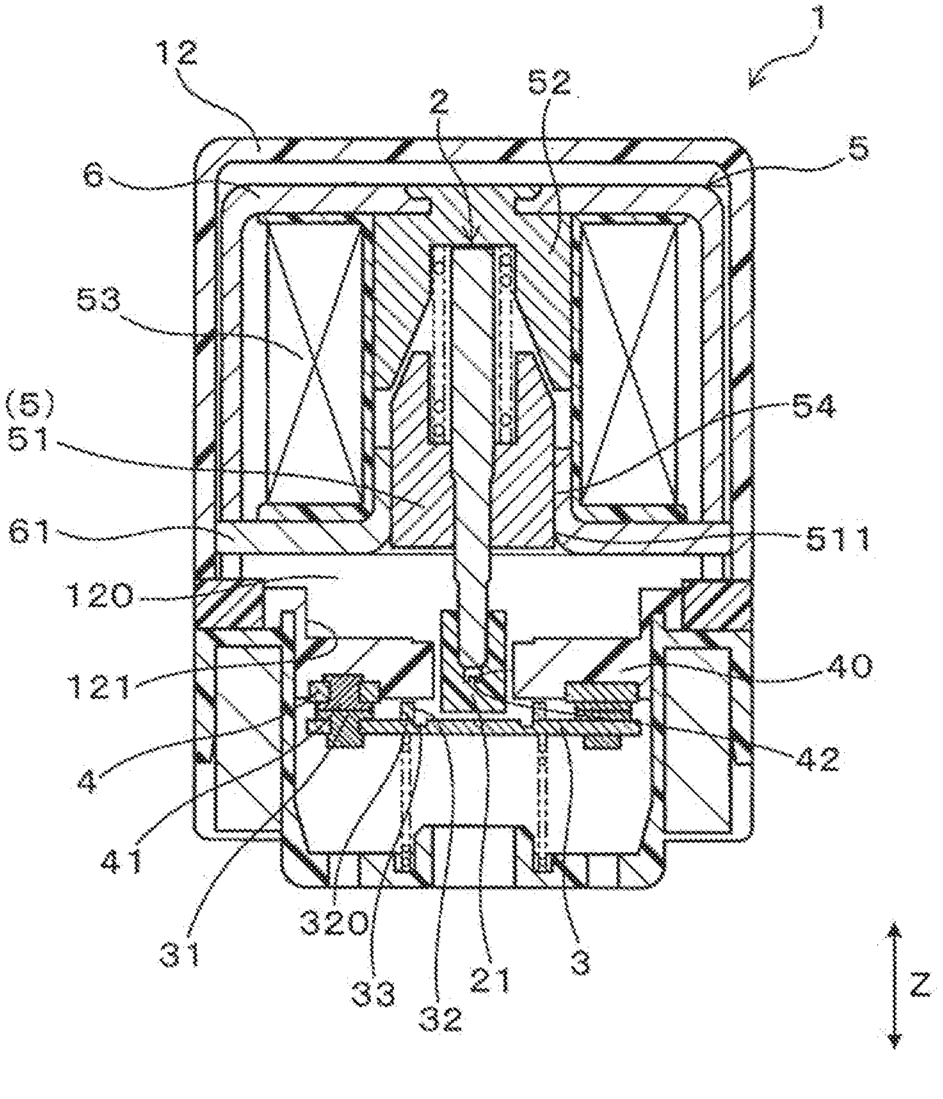
FIG. 16 is an axial cross-sectional view of the electromagnetic relay device according to the sixth embodiment with the first to third movable contacts respectively abutting onto the corresponding first to third stationary contacts.
Figure 17:
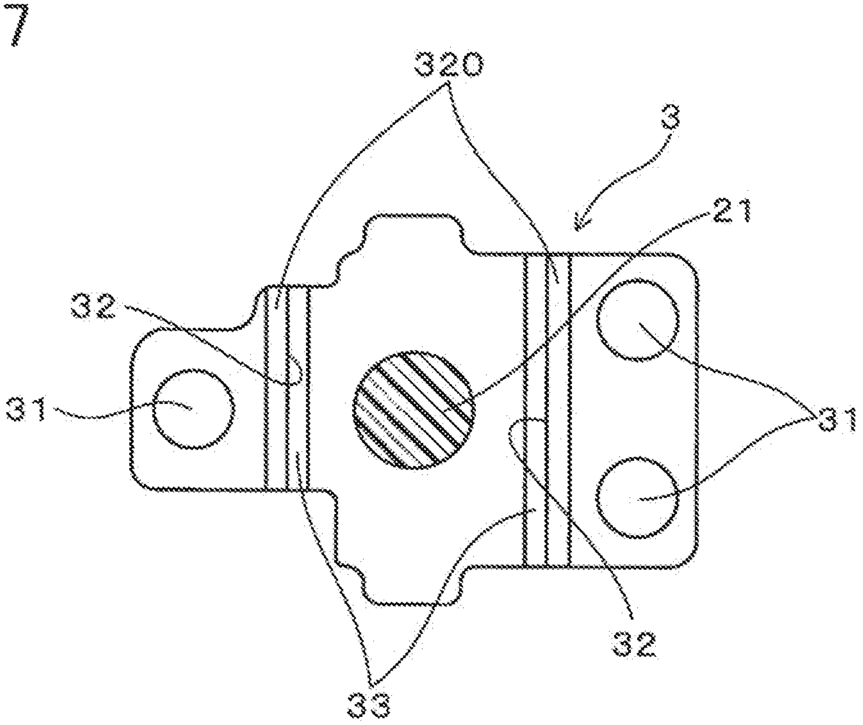
FIG. 17 is a transverse cross-sectional view taken along line XVII-XVII in FIG. 15.

As illustrated in FIGS. 15 to 17, the plate-like member of the mover 3 has a rearward major surface toward the solenoid unit 5. The first and second inward walls 32 are mounted on the rearward major surface of the plate-like member of the mover 3 to face inward.

The first inward wall 32 is located closer to an outer periphery of the mover 3 than the through hole 42 is, and located closer to a center of the mover 3 than the first movable contacts 31 are; the first movable contacts are mounted on the first longitudinal end of the rearward major surface of the plate-like member of the mover 3.

Similarly, the second inward wall 32 is located closer to the outer periphery of the mover 3 than the through hole 42 is, and located closer to the center of the mover 3 than the second movable contact 31 is; the second movable contact 31 is mounted on the second longitudinal end of the rearward major surface of the plate-like member of the mover 3.

More specifically, a first protruding wall member 320 is mounted on the rearward major surface of the plate-like member of the mover 3 to protrude in the rearward direction. Similarly, a second protruding wall member 320 is mounted on the rearward major surface of the plate-like member of the mover 3 to protrude in the rearward direction. An inner side of the first protruding wall member 320, which faces inward toward the slidable contact portion 54, serves as the first inward wall 32 of the first protruding wall member 320. Similarly, an inner side of the second protruding wall member 320, which faces inward toward the slidable contact portion 54 serves as the second inward wall 32 of the second protruding wall member 320.

Each of the first and second protruding wall members 320 extends across a corresponding portion of the plate-like member of the mover 3 in a lateral direction of the plate-like member thereof. In other words, the first protruding wall member 320 partitions the rearward major surface of the plate-like member of the mover 3 into a first end region on which the first movable contacts 31 are mounted and a center region onto which the insulator member 21 abuts. Similarly, the second protruding wall member 320 partitions the rearward major surface of the plate-like member of the mover 3 into a second end region on which the second movable contact 31 is mounted and the center region onto which the insulator member 21 abuts. Three or more protruding wall members can be mounted on the rearward major surface of the plate-like member of the mover 3.

As illustrated in FIG. 17, the mover 3 includes, as illustrated in FIG. 17, first and second grooves 33 formed in the center region of the rearward major surface of the plate-like member of the mover 3; the first and second grooves 33 are arranged along the respective first and second protruding wall members 320. That is, the first and second grooves 33 are located inside the respective first and second protruding wall members 320. The first groove 33 has an inner side facing inward toward the slidable contact portion 54; the inner side of the first groove 33 serves as a first inward wall 32 of the first groove 33. Similarly, the second groove 33 has an inner side facing inward toward the slidable contact portion 54; the inner surface of the second groove 33 serves as a second inward wall 32 of the second groove 33.

The first inward wall 32 of the first protruding wall member 320 is flush with the first inward wall 32 of the first groove 33, and the second inward wall 32 of the second protruding wall member 320 is flush with the second inward wall 32 of the second groove 33.

The other components of the electromagnetic relay device 1 according to the sixth embodiment are substantially identical to the corresponding respective components of the electromagnetic relay device 1 according to the first embodiment.

The first and second inward walls 32 are mounted on the rearward major surface of the plate-like member of the mover 3. Therefore, even if foreign particles at the slidable contact portion 54 move onto the mover 3 through the through hole 42 of the stationary-contact support 40, this configuration of the electromagnetic relay device 1 enables (i) The first inward wall 32 to keep the foreign particles from moving outward toward the first movable contacts 31

(ii) The second inward wall 32 to keep the foreign particles from moving outward toward the second movable contact 31

This therefore inhibits the foreign particles from entering into the contact region 11. In particular, the first and second inward walls 32 are configured to reciprocate together with the mover 3. This configuration reduces a detrimental effect due to the configuration of the first and second inward walls 32 on reciprocation of the mover 3, making it possible to reduce a detrimental effect due to the configuration of the first and second inward walls 32 on speedy switching operations of the electromagnetic relay device 1.

The first inward wall 32 of the first protruding wall member 320 is flush with the first inward wall 32 of the first groove 33, and the second inward wall 32 of the second protruding wall member 320 is flush with the second inward wall 32 of the second groove 33. It is not until foreign particles, which have entered in the first groove 33, move by at least the sum of (i) a distance of the first inward wall 32 of the first groove 33 in the Z direction and (ii) a distance of the first inward wall 32 of the first protruding wall member 320 in the Z direction that the foreign particles move into the contact region 11. Similarly, it is not until foreign particles, which have entered in the second groove 33, move by at least the sum of (i) a distance of the second inward wall 32 of the second groove 33 in the Z direction and (ii) a distance of the second inward wall 32 of the second protruding wall member 320 in the Z direction that the foreign particles move into the contact region 11.

This results in foreign maters being likely to move radially outside of each of the first and second inward walls 32, making it possible to more efficiently keep the foreign particles from moving toward the contact region 11.

The electromagnetic relay device 1 according to the sixth embodiment offers additional advantageous effects that are identical to those offered by the electromagnetic relay device 1 according to the first embodiment.

The movable wall member 7, which has been described in one of the first to fifth embodiments, can be mounted to the plunger 2 in addition to the first and second inward walls 32 being mounted on the rearward major surface of the plate-like member of the mover 3 according to the sixth embodiment. This creates a dramatic effect of keeping foreign particles from moving toward the contact region 11.

Seventh Embodiment

Figure 18:
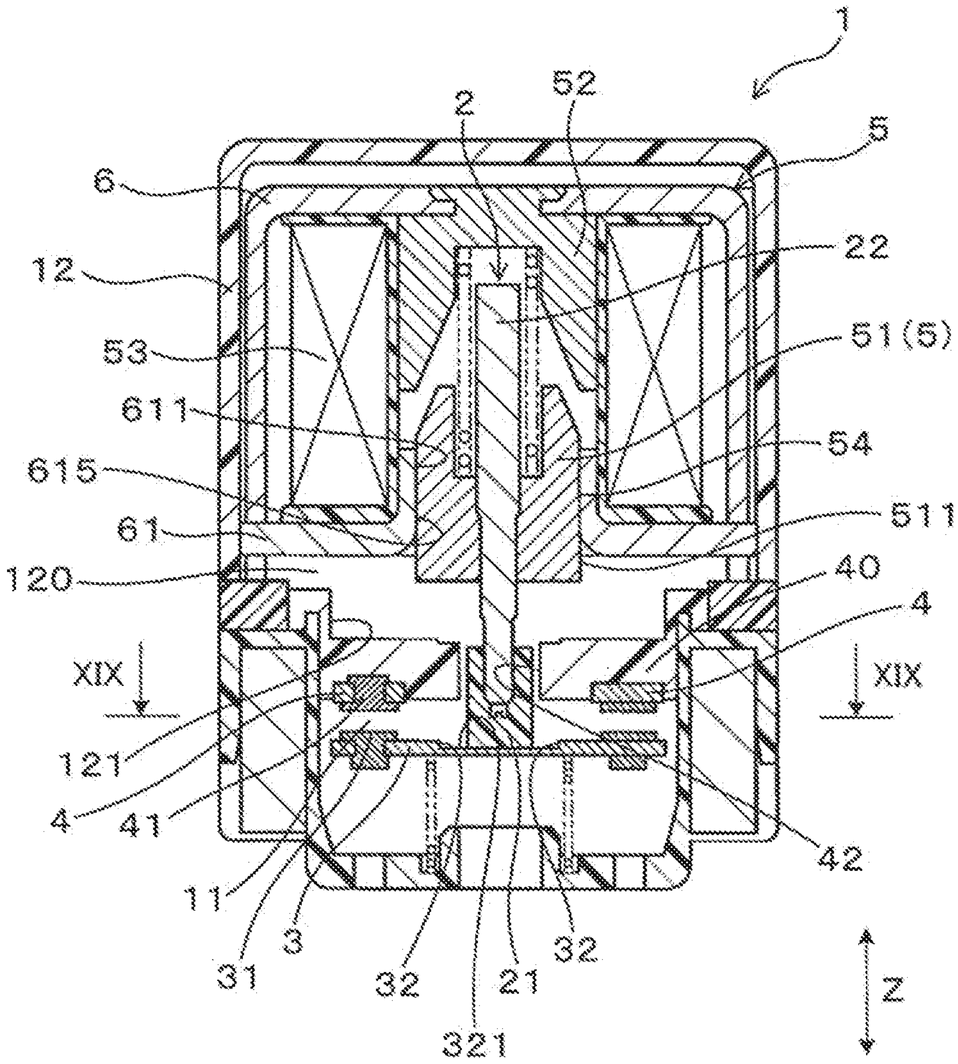
FIG. 18 is an axial cross-sectional view of an electromagnetic relay device according to the seventh embodiment.
Figure 19:
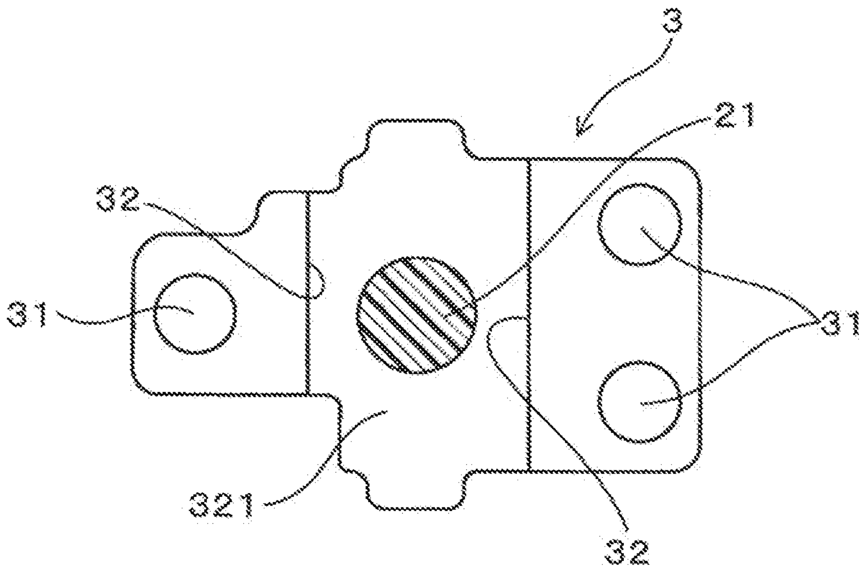
FIG. 19 is a transverse cross-sectional view taken along line XIX-XIX in FIG. 18.

In comparison with the electromagnetic relay device 1 according to the sixth embodiment, the electromagnetic relay device 1 according to the seventh embodiment is modified such that, as illustrated in FIGS. 18 and 19, the rearward major surface of the plate-like member of the mover 3 includes a concave recess 321 formed therein to define the first and second inward walls 32.

The first inward wall 32 of the concave recess 321 is located radially outside the through hole 42 of the stationary-contact support 40 and radially inside the first movable contacts 31 in the longitudinal direction of the mover 3. Similarly, the second inward wall 32 of the concave recess 321 is located radially outside the through hole 42 of the stationary-contact support 40 and radially inside the second movable contact 31 in the longitudinal direction of the mover 3.

The concave recess 321 extends across a predetermined portion of the rearward major surface of the plate-like member of the mover 3 in the lateral direction of the plate-like member thereof. The concave recess 321 has first and second inner sides; the first inner side, which is closer to the first movable contacts 31 than the second inner side is, serves as the first inward wall 32, and the second inner side, which is closer to the second movable contact 31 than the first inner side is, serves as the second inward wall 32.

The concave recess 321 has, as illustrated in FIG. 18, a bottom onto which the rearward end of the insulator member 21 is arranged to abut.

The other components of the electromagnetic relay device 1 according to the seventh embodiment are substantially identical to the corresponding respective components of the electromagnetic relay device 1 according to the sixth embodiment.

Additionally, the electromagnetic relay device 1 according to the seventh embodiment offers additional advantageous effects that are identical to those offered by the electromagnetic relay device 1 according to the sixth embodiment.

The movable wall member 7 according to each of the first, second, fourth, and fifth embodiments is made of metal, such as iron alloy, but can be made of a material with a lower specific gravity than that of iron alloy, such as resin. The movable wall member 7 made of resin according to a modification results in the weight of the movable wall member 7 lighter than that of the movable wall member 7 made of metal. This results in noise during movement of the plunger 2 being reduced.

The present disclosure is not limited to the above-described embodiments, and can be variably modified within the scope of the present disclosure.

While the illustrative embodiments of the present disclosure have been described herein, the present disclosure is not limited to the embodiments and configurations described herein. Specifically, the present disclosure can include any and all modified embodiments and modifications within the range of equivalency of the present disclosure. Additionally, various combinations of the embodiments, modified combinations to which at least one element has been added, or modified combinations from which at least one element has been eliminated are within the scope of the present disclosure and/or the patentable ideas of the present disclosure.

What is claimed is:

1. An electromagnetic relay device comprising:

a mover including a movable contact movable to abut onto and separate from a stationary contact through a contact region between the movable contact and the stationary contact;

a plunger configured to cause the mover to reciprocate to accordingly cause the movable contact to abut onto or separate from the stationary contact;

a solenoid unit configured to cause the plunger to reciprocate in a predetermined reciprocation direction, the solenoid unit comprising:

an electromagnetic coil configured to generate magnetic flux when energized;

a movable core having a slidable contact portion that has an outer peripheral surface, the movable core being configured to reciprocate based on energization of the electromagnetic coil; and a support member configured to slidably support the outer peripheral surface of the slidable contact portion of the movable core;

a movable wall member between the slidable contact portion and the contact region, the movable wall member being linked to the plunger and the movable wall member being configured to reciprocate together with the plunger, the movable wall member being arranged to occupy a region in the electromagnetic relay device, the region containing at least the slidable contact portion when viewed in the reciprocation direction; and a housing having an inner peripheral surface, wherein the mover, the plunger, and the solenoid unit are installed in the housing; and the movable wall member has an outer peripheral edge, and is arranged such that the outer peripheral edge faces the inner peripheral surface of the housing with an annular clearance formed therebetween.

2. The electromagnetic relay device according to claim 1, wherein:

the movable wall member has a major surface that faces the slidable contact portion and an outer periphery; and the movable wall member includes at least one protruding wall member on an outer region of the major surface of the movable wall member that protrudes toward the slidable contact portion in the reciprocation direction, the outer region being closer to the outer periphery of the movable wall member than the slidable contact portion is.

3. The electromagnetic relay device according to claim 1, further comprising:

a housing that has an inner peripheral surface that defines an inner chamber thereinside, the housing being configured to house the mover, the plunger, and the solenoid unit in the inner chamber, wherein:

the movable wall member has an outer peripheral edge; and the outer peripheral edge of the movable wall member extends along a portion of the inner peripheral surface of the housing.

* * * * *